US006411617B1

(12) United States Patent
Kilkki et al.

(10) Patent No.: US 6,411,617 B1
(45) Date of Patent: Jun. 25, 2002

(54) SYSTEM AND METHOD FOR MANAGING DATA TRAFFIC ASSOCIATED WITH VARIOUS QUALITY OF SERVICE PRINCIPLES USING A CONVENTIONAL NETWORK NODE SWITCH

(75) Inventors: Matti Kalevi Kilkki, Lexington, MA (US); Jussi Pekka Olavi Ruutu, Espoo (FI)

(73) Assignee: Nokia Telecommunications, Oy, Espoo (FI)

(*) Notice: Subject to any disclaimer, the term of this patent is extended or adjusted under 35 U.S.C. 154(b) by 0 days.

(21) Appl. No.: 09/209,138

(22) Filed: Dec. 10, 1998

(51) Int. Cl.⁷ .............................................. H04L 12/56
(52) U.S. Cl. ................................. 370/353; 370/395.42
(58) Field of Search .................. 370/395, 389, 370/229–240, 351, 352, 535, 537, 399, 428, 254, 252, 395.57, 395.31, 395.32, 395.42, 400, 401, 402, 412, 411, 444, 455, 353

(56) References Cited

U.S. PATENT DOCUMENTS

| | | | |
|---|---|---|---|
| 5,153,877 A | 10/1992 | Esaki et al. ................. 870/94.1 |
| 5,287,347 A | 2/1994 | Spanke ......................... 370/17 |
| 5,410,585 A | 4/1995 | Kawaharata ................. 428/681 |
| 5,541,913 A | 7/1996 | Witters et al. ............. 370/94.1 |
| 5,557,608 A | 9/1996 | Calvignac et al. ............. 370/60 |
| 5,600,641 A | 2/1997 | Duault et al. ............... 370/400 |
| 5,708,660 A | 1/1998 | Riedel ......................... 370/397 |
| 5,748,615 A | 5/1998 | Riedel et al. ............... 370/238 |
| 5,757,784 A | 5/1998 | Liebowitz et al. .......... 370/321 |
| 5,768,521 A | 6/1998 | Dedrick ................. 370/200.54 |
| 5,768,627 A | 6/1998 | Jones et al. ................. 395/880 |
| 5,784,358 A | 7/1998 | Smith et al. ................. 370/234 |
| 5,790,522 A | 8/1998 | Fichou et al. ............... 370/236 |
| 5,805,577 A | 9/1998 | Jain et al. ................... 370/234 |
| 5,805,585 A | 9/1998 | Javitt et al. ................. 370/342 |
| 5,812,527 A | 9/1998 | Kline et al. ................. 370/232 |
| 5,818,818 A | 10/1998 | Soumiya et al. ............ 370/252 |
| 5,828,653 A | 10/1998 | Goss .......................... 370/230 |
| 5,838,922 A | 11/1998 | Galand et al. .............. 395/412 |
| 5,999,518 A | * 12/1999 | Nattkemper et al. ........ 370/258 |
| 6,026,092 A | * 2/2000 | Abu-Amara et al. ........ 370/424 |
| 6,032,272 A | * 2/2000 | Soirinsuo et al. ........... 370/236 |

OTHER PUBLICATIONS

Ruutu et al., Performance of Simple Integrated Media Access(SIMA), SPIE vol. 3233 pp. 298–307.
Wu et al., A Dual Bus Approach for LAN Interworking With ATM Networks, ACM SIGCOMM, Computer Communication Review, pp. 66–85.

(List continued on next page.)

Primary Examiner—Dang Ton
(74) Attorney, Agent, or Firm—Altera Law Group LLC

(57) ABSTRACT

A system and method for communicating first data packets having a first quality of service over a network system designed for communicating second data packets having a second quality of service. The network system includes a plurality of network nodes, where each of the network nodes includes a network switch. The first data packets are switched from each of a plurality of network switch input ports to a dedicated output port of the network switch. Network node congestion control is applied to the first data packets at the dedicated output port to selectively accept or discard the first data packets in accordance with their respective quality of service acceptance principles. Those of the first data packets that were accepted are multiplexed into one or more virtual paths having common output port destinations, and the virtual paths are input into a dedicated input port of the network switch. The virtual paths at the dedicated input port are switched to output port destinations of the network switch identified by the common output port destinations.

18 Claims, 9 Drawing Sheets

OTHER PUBLICATIONS

Parulkar et al., A Strategy for Integrating IP with ATM, Computer Communication Review, 25(1995) Oct., No. 4, New York US, pp. 49–58.

"Traffic Control and Congestion Control in B–ISDN", ITU–T Recommendation 1.371, pp. 1–27 (Mar. 1993).

"ATM Service Categories: The Benefits to the User", http://www.atmforum.com/atmforum/service categories.html, last updated Aug. 22, 1996, pp. 1–10.

"What are the Meaning of CBR, VBR, ABR, UBR? ", http://cell–relay.indiana.edu/cell–relay/FAQ/ATM–FAQ/d/d19.htm, last updated Aug. 20, 1996, pp. 1–2.

"ATM Lecture", http://syllabus.syr.edu/Ist/Mweschen/Ist656/Week4/lecture/atm/atm.htm, pp. 1–5.

"Traffic Management Specification Version 4.0", ATM Forum Technical Committee, pp. 1–59 (Apr. 1996).

* cited by examiner

SYSTEM AND METHOD FOR MANAGING DATA TRAFFIC ASSOCIATED WITH VARIOUS QUALITY OF SERVICE PRINCIPLES USING A CONVENTIONAL NETWORK NODE SWITCH

FIELD OF THE INVENTION

The present invention relates generally to network communications systems, and more particularly, to a method and apparatus for transmitting and switching data packets operating under the principles of a first quality of service (e.g., SIMA technology) in a system designed to transmit and switch data packets operating under the principles of another quality of service (e.g., ATM technology).

BACKGROUND OF THE INVENTION

Communication of digital content between remote computing systems is increasing at astronomical rates as networks continue to proliferate throughout the globe. A great majority of personal computers used in business and in educational institutions are connected to a network, and the importance of emerging network technologies continues to increase as the masses feverishly enter the domain of the Internet. Data, audio, graphics, motion video, and other multimedia content are all vying for transmission availability in an era of limited, yet improving, bandwidths.

Providers of network services, and of communications system infrastructure, are faced with a number of complex issues in providing necessary bandwidth and quality service. These issues include management of network capacity, prioritization and management of both real-time and non-real-time data traffic, and implementing fair billing schemes. One solution to many of these problems is the use of packet-based digital data transmissions having an associated "quality of service," such as the transmission technology referred to as Asynchronous Transfer Mode (ATM). Those skilled in the art understand ATM to constitute a communications networking concept that, in theory, addresses many of the aforementioned concerns, such as by providing a capability to manage increases in network load, supporting both real-time and non-real-time applications, and offering, in certain circumstances, a guaranteed level of service quality.

A conventional ATM service architecture typically provides a number of predefined quality of service classes, often referred to as service categories. Each of the service categories includes a number of quality of service (QoS) parameters that define the nature of the respective service category. In other words, a specified service category provides performance to an ATM virtual connection (VCC or VPC) in a manner specified by a subset of the ATM performance parameters. The service categories defined in the ATM Forum specification reference hereinbelow include, for example, a constant bit rate (CBR) category, a real-time variable bit rate (rt-VBR) category, a non-real-time variable bit rate (nrt-VBR) category, an unspecified bit rate (UBR) category, and an available bit rate (ABR) category.

The constant bit rate service class is intended to support real-time applications that require a fixed quantity of bandwidth during the existence of the connection. A particular quality of service is negotiated to provide the CBR service, where the QoS parameters include characterization of the peak cell rate (PCR), the cell loss rate (CLR), the cell transfer delay (CTD), and the cell delay variation (CDV). Conventional ATM traffic management schemes guarantee that the user-contracted QoS is maintained in order to support, for example, real-time applications, such as circuit emulation and voice/video applications, which require tightly constrained delay variations.

The non-real-time VBR service class is intended to support non-real-time applications, where the resulting network traffic can be characterized as having frequent data bursts. Similarly, the real-time variable bit rate service category may be used to support "bursty" network traffic conditions. The rt-VBR service category differs from the nrt-VBR service category in that the former is intended to support real-time applications, such as voice and video applications. Both the real-time and non-real-time VBR service categories are characterized in terms of a peak cell rate (PCR), a sustainable cell rate (SCR), and a maximum burst size (MBS).

The unspecified bit rate (UBR) service category is often regarded as a "best effort service," in that it does not specify traffic-related service guarantees. As such, the UBR service category is intended to support non-real-time applications, including traditional computer communications applications such as file transfers and e-mail.

The available bit rate (ABR) service category provides for the allocation of available bandwidth to users by controlling the rate of traffic through use of a feedback mechanism. The feedback mechanism permits cell transmission rates to be varied in an effort to control or avoid traffic congestion, and to more effectively utilize available bandwidth. A resource management (RM) cell precedes the transmission of data cells, which is transmitted from source to destination and back to the source, in order to provide traffic information to the source.

Although the current ATM service architecture described above would appear to provide, at least at a conceptual level, viable solutions to the many problems facing the communications industry, ATM, as currently defined, requires implementation of a complex traffic management scheme in order meet the objectives articulated in the various ATM specifications and recommendations currently being considered. In order to effectively manage traffic flow in a network, conventional ATM traffic management schemes must assess a prodigious number of traffic condition indicators, including service class parameters, traffic parameters, quality of service parameters and the like. A non-exhaustive listing of such parameters and other ATM traffic management considerations is provided in ITU-T Recommendation I.371, entitled Traffic Control and Congestion Control in B-ISDN, and in Traffic Management Specification, version 4.0 (af-tm-0056.000, April 1996), published by the Technical Committee of the ATM Forum.

Notwithstanding the complexity of conventional ATM traffic management schemes, current ATM specifications and recommendations fail to adequately address the need of service providers for a methodology that provides for accurate and reliable charging of services utilized by user's of the network. Even if one were to assume that a charging scheme that accounts for most or all of the currently defined ATM traffic management properties could be developed, such a scheme would necessarily be complex and would typically require administration by highly skilled operators. The high overhead and maintenance costs to support such a billing scheme would likely be passed on to the network provider and, ultimately, to the network user.

The present invention is applicable in a network service class which incorporates a priority-based quality of service. This service class, hereinafter referred to as the Simple Integrated Media Access (SIMA) service class, provides a network management architecture that is simple in concept and in its implementation, yet adequately addresses the quality of service requirements to support a variety of network services, including real-time and non-real-time services. It also provides for the implementation of a simple and effective charging capability that accounts for the use of network services.

However, the existing network infrastructure does not necessarily account for data transmissions utilizing the SIMA service class, which includes a priority-based quality of service. For example, existing ATM switches residing in network nodes are not configured to manage data traffic based on the packet priorities and allowable node priorities implemented in a SIMA service class, and the benefits associated with the SIMA service class are not recognized.

Accordingly, there is a need in the communications industry for a network management method and architecture that recognizes SIMA packets and accounts for the traffic management principles provided by a SIMA service class within a conventional, non-priority-based network infrastructure such as an ATM network system. The present invention provides a solution to these and other shortcomings of the prior art, and offers additional advantages over the prior art.

SUMMARY OF THE INVENTION

The present invention is directed to a system and method for communicating SIMA information elements over a non-SIMA network. The present invention can be used in connection with a conventional network switch, such as an ATM switch, such that the inclusion of SIMA traffic on the network is recognized as standard ATM traffic as far as the ATM switch is concerned. The present invention makes possible the multiplexing of SIMA traffic over ATM connections, while accommodating the quality of service principles that make SIMA a valuable service.

In accordance with one embodiment of the present invention, a method is provided for communicating first data packets having a first quality of service over a network system designed for communicating second data packets having a second quality of service. The network system comprises a plurality of network nodes, where each of the network nodes includes a network switch. The method includes switching the first data packets from each of a plurality of network switch input ports to a dedicated output port of the network switch. Network node congestion control is applied to the first data packets at the dedicated output port to selectively accept or discard the first data packets in accordance with their respective quality of service acceptance principles. Those of the first data packets that were accepted are multiplexed into one or more virtual paths having common output port destinations, and the virtual paths are input into a dedicated input port of the network switch. The virtual paths at the dedicated input port are switched to output port destinations of the network switch identified by the common output port destinations.

In accordance with another embodiment of the invention, a method of communicating Simple Integrated Media Access (SIMA) information elements over a conventional, non-SIMA network system is provided. The non-SIMA network system includes at least one network node having a network switch. The method includes reserving at least one virtual path from each input port of the network switch for transmitting the SIMA information elements into the network switch. The reserved virtual paths from each of the input ports are switched to a dedicated output port of the network switch. Network node congestion control is applied to the SIMA information elements in accordance with pre-defined SIMA priority principles. Virtual channels from each of the reserved virtual paths are multiplexed at the dedicated output port such that the virtual channels having common output port destinations are collectively bundled into distinct virtual path outputs. The distinct virtual path outputs are provided to a dedicated input port of the network switch, and are switched to their respective output ports of the network switch based on the common output port destinations.

In accordance with another aspect of the invention, a network system capable of communicating packet-based SIMA and non-SIMA information elements between two or more end units in the network system is provided. The network system includes a non-SIMA network switch for multiplexing and routing the packet-based information elements between switch input ports and switch output ports on the network switch based on an information element address. The network switch includes a dedicated output port coupled to at least one of the inputs ports through the network switch to receive the SIMA information elements, and includes a dedicated input port to receive filtered SIMA information elements. The network system further includes a switch extension module coupled to the dedicated output port to receive the SIMA information elements, and to the dedicated input port to provide the filtered SIMA information elements to the dedicated input port. The extension module includes a packet filtering module to generate the filtered SIMA information elements by applying SIMA congestion management principles to each of the received SIMA information elements. In this manner, SIMA information elements can be seamlessly switched using the non-SIMA network switch.

DETAILED DESCRIPTION OF THE VARIOUS EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The present invention is directed to a system and method for integrating conventional network service systems and Simple Integrated Media Access (SIMA) network service systems. The SIMA service model incorporates the basic properties of ATM with the addition of eight priority levels as defined within the context of a new service concept termed a nominal bit rate, or NBR, service. In general, the NBR service provides for the simple and efficient division of network capacity among different connections and the charging of user fees for the use of such connections. A network or group of networks, such as the Internet, may be cooperatively integrated with a SIMA network using the principles of the present invention.

A typical implementation of a SIMA service utilizes two primary components: access nodes and core network nodes, which have fundamentally different functional responsibilities. For example, access nodes, which may be a user/network interface, perform the tasks of measuring traffic for every connection, and determining a cell or packet priority based on a ratio of the momentary actual bit rate (MBR) of the source to the nominal bit rate (NBR) assigned to the source. SIMA network core nodes forward the SIMA packets from input to output(s), and discard packets based on the priority of a packet and the occupancy levels of the buffers in the core node. The core nodes, therefore, do not need to know anything about the properties of individual connections.

The realization and benefits of a SIMA network may be determined in a manner described herein and in copending U.S. patent application, Ser. No. 08/821,273 entitled "Nominal Bit Rate Network Service", filed on Mar. 20, 1997, which is assigned to the assignee of the instant application, the contents of which are incorporated herein by reference.

A network implemented in accordance with the principles of the present invention allows a SIMA network to be integrated with-a conventional, unmodified network switch such as an ATM network switch. ATM connections carrying SIMA traffic can be multiplexed, and ATM cells discarded according to the priority principles of SIMA. While the SIMA integration method and system according to the present invention may be applicable to many different conventional network switching systems, an appreciation of the principles of the invention is best obtained in the context of the following diagrams, in which an ATM SIMA Extender (ASE) used in connection with an ATM switch is shown according to the present invention.

Figure 1:
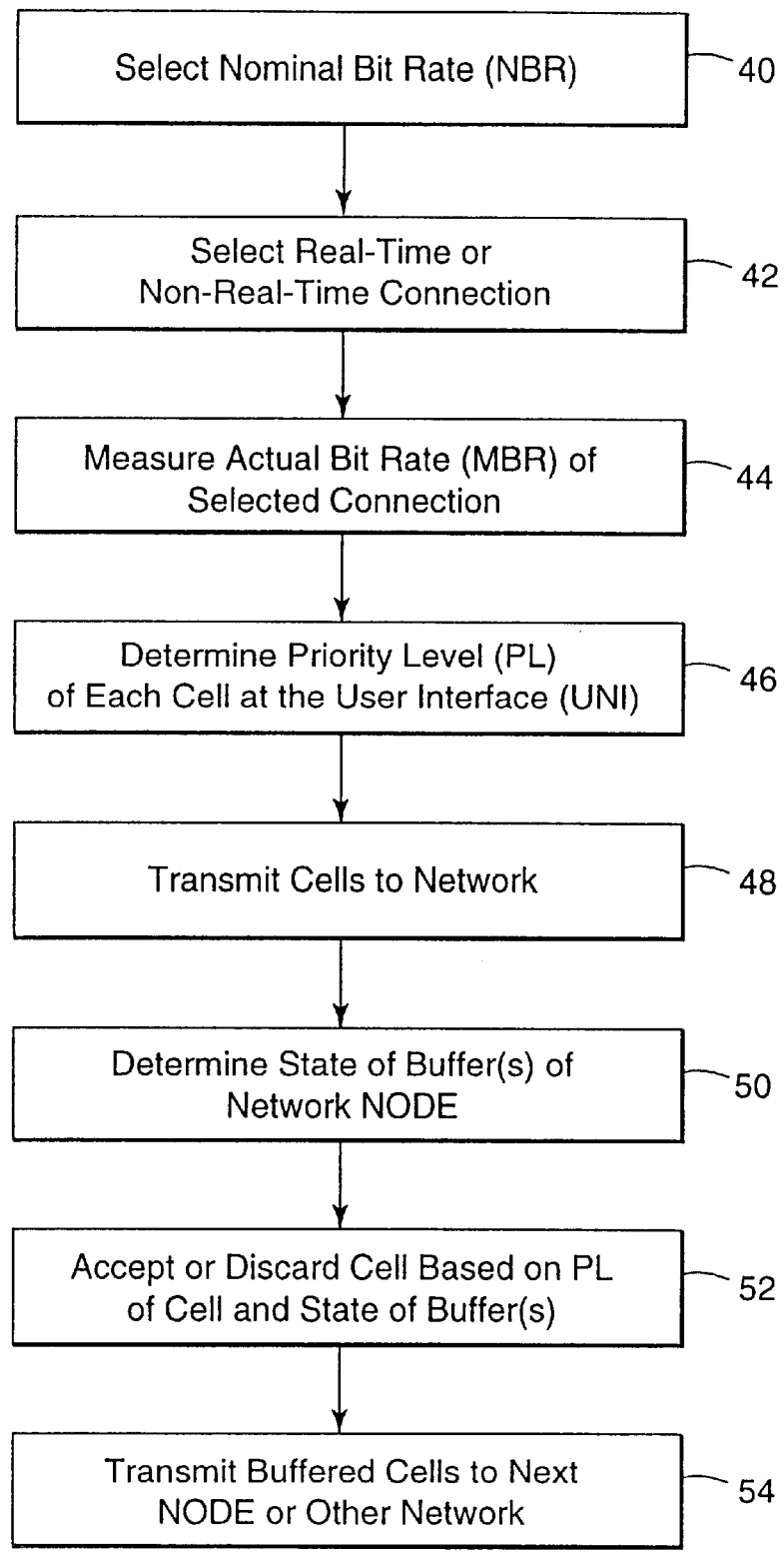
FIG. 1 is a flow diagram illustrating a general procedure for communicating cells of information between a user/network interface and a network using a nominal bit rate service in accordance with the present invention.

To obtain an understanding of an ATM/SIMA cooperative network, the SIMA nominal bit rate (NBR) concept is first described. Referring now to FIG. 1, there is shown a general methodology for transmitting information between a user/network interface and a network over an NBR service connection. Initially, a user negotiates or selects 40 a nominal bit rate with the network operator, which may be performed prior to, or at the time of, establishing the connection. In one embodiment, the user informs the network operator that a desired NBR is required, and the requested connection bandwidth is allocated to the user. The network operator, in accordance with this embodiment, need not perform the task of analyzing current network load conditions existing at the core network nodes prior to establishing or releasing an NBR connection. In an alternative embodiment, the network operator performs the task of determining network load status prior to establishing or releasing an NBR connection, although this task may not be necessary in a properly dimensioned network supporting an NBR service.

Depending on a particular application, the user selects 42 a real-time or a non-real-time network connection. The process of determining the priority level (PL) of each cell, which indicates the importance or criticality of the cell relative to other cells, involves measuring 44 the actual or measured bit rate (MBR) of the selected real-time or non-real-time connection at the UNI. The priority level of each cell is determined 46 at the UNI. In one embodiment of the invention, a ratio of the MBR and the NBR is used to determine 46 the PL.

After computing the priority level of each cell at the UNI, the cells are transmitted 48 to the network, such as to a node of the network. A network node, upon arrival of a cell transmitted from the UNI, performs a cell filtering process by which the node determines whether to accept or discard a particular cell. The cell filtering process involves determining 50 the state of one or more buffers or memories of the network node to determine a buffer or memory occupancy level. The node accepts or discards 52 a cell based on the priority level of the cell and the state of the node buffer. Cells that meet the filtering criteria determined at the node are accepted, buffered, and eventually transmitted 54 to another node in the network or another network in a manner consistent with the expected quality of service for the connection.

Figure 2:
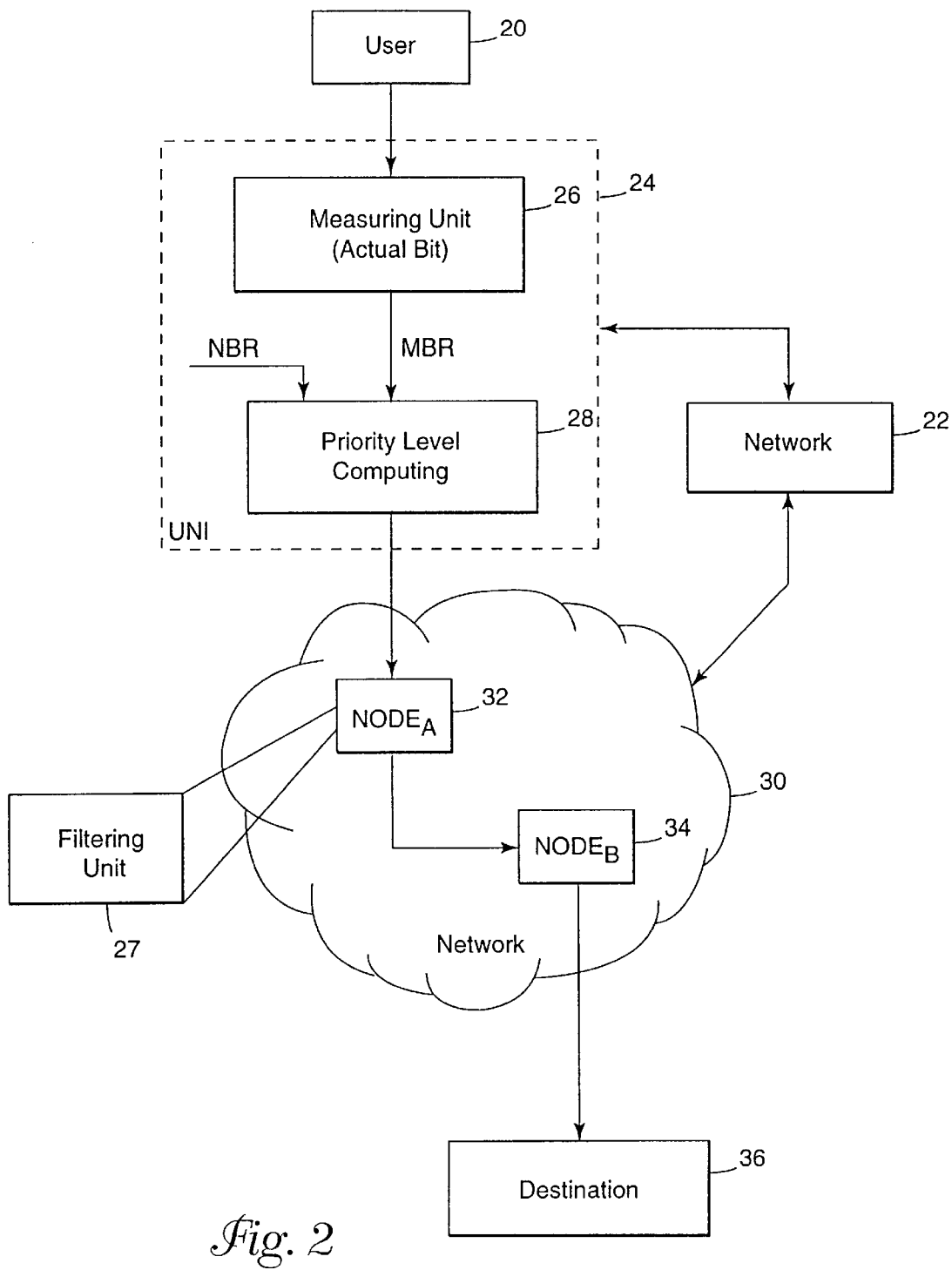
FIG. 2 is a system block diagram of a nominal bit rate service architecture in accordance with the present invention.

Concerning the embodiment illustrated in block diagram form in FIG. 2, there is shown a user 20 that employs a UNI 24 to communicate with a network 30. The user 20 negotiates a nominal bit rate with the network operator 22. The network operator 22 evaluates the user's NBR request based on a number of factors, including the NBR negotiated with other users 20, the number and nature of different connections associated with other users of the network, and other factors affecting network capacity and traffic flow. In principle, NBR can be zero, in which case all cells communicated through the UNI 24 are given lowest priority within the network 30. The value of NBR may also be greater than the transmission capacity at the UNI 24. If the value of NBR is significantly greater than the transmission capacity, for example, all cells transmitted from the UNI 24 are given highest priority within the network 30. It is noted that the priority level of a cell as defined herein has meaning within a network or a number of networks that embraces the NBR service concept. Cells that traverse beyond a network that offers an NBR service, such as by use of an network/network interface (NNI), may be processed in accordance with the traffic management strategy employed by such other network.

In contrast to conventional network services which are designed to provide a guaranteed quality of service, the network operator 22 does not guarantee the continuous availability of the user negotiated NBR. A properly dimensioned network, however, should provide adequate bandwidth to virtually ensure, although not guarantee, the availability of an established NBR. It is noted that all users who are transmitting data with an equivalent NBR encounter approximately the same quality of service.

Having established an NBR with the network operator 22, the user 20 is permitted to communicate information to a desired destination 36 via the network 30. A measuring unit 26 measures the actual or instantaneous bit rate (i.e., MBR) of each cell communicated between the UNI 24 and the network 30. Prior to departure of a cell from the UNI 24, a priority level computing unit 28 determines a priority level for the cell using the negotiated NBR and the MBR. In accordance with one embodiment, one of eight priority levels may be attributed to a given cell. The priority level computing unit 28 determines the priority level of a particular cell by computing a ratio of MBR to NBR. The priority level determined by the computing unit 28 is assigned to the cell which is then transmitted from the UNI 24 to the network 30.

The UNI 24 transmits the cell, which contains priority level information, to a node of the network 30, such as node$_A$ 32. The node$_A$ 32 accepts or discards the cell received from the UNI 24 based on the priority level of the cell and the buffering capacity of node$_A$ 32. In general, as the occupancy of the buffer or memory of node$_A$ 32 increases (i.e., becomes more filled), cells having a lower priority (i.e., higher priority level value) are discarded in favor of accepting cells having a higher priority (i.e., lower priority level value). As the occupancy level of the buffer of node$_A$ 32 decreases (i.e., becomes less filled), the node$_A$ 32 becomes increasingly tolerant toward accepting cells of lower priority (i.e., higher priority level values). Cells that are buffered in node$_A$ 32 are subsequently transmitted to another node in the network 30, such as node$_B$ 34, or other network and, ultimately, to an end-destination 36.

The exemplary network 30 used for purposes of this description is depicted as a network having two intermediary nodes 32 and 34. These nodes represent network data communications elements such as routers, switches and multiplexers. However, as will be appreciated by those skilled in the art, the present invention may likewise be implemented in various multi-node network structures such as multipoint, star, ring, loop and mesh network topologies used in networks ranging from local area networks (LAN) to proliferative global area networks (GAN) such as the Internet.

Figure 3:
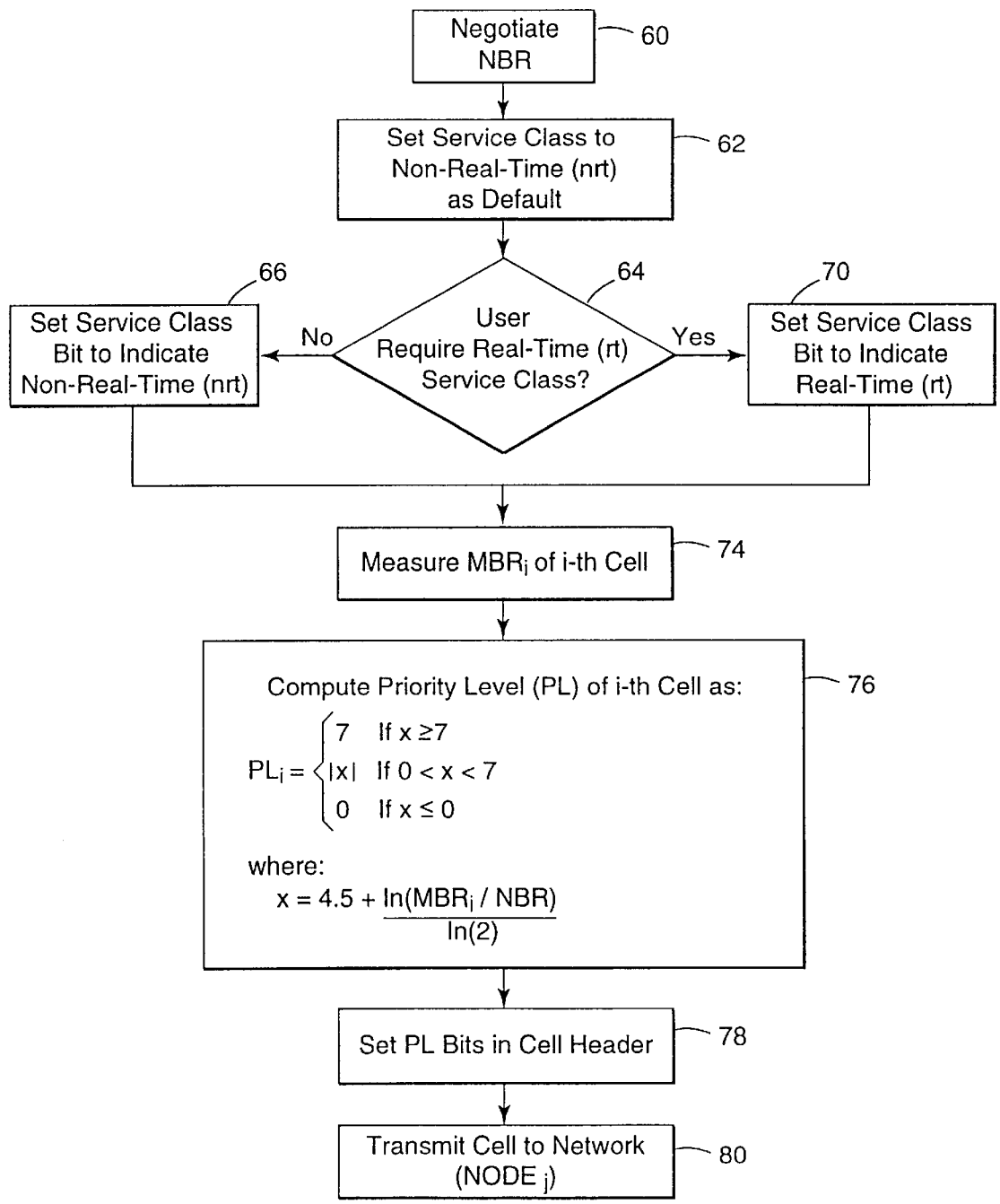
FIG. 3 illustrates in greater detail a procedure for transmitting cells of information between a user/network interface and a network using a nominal bit rate service in accordance with the present invention.
Figure 4:
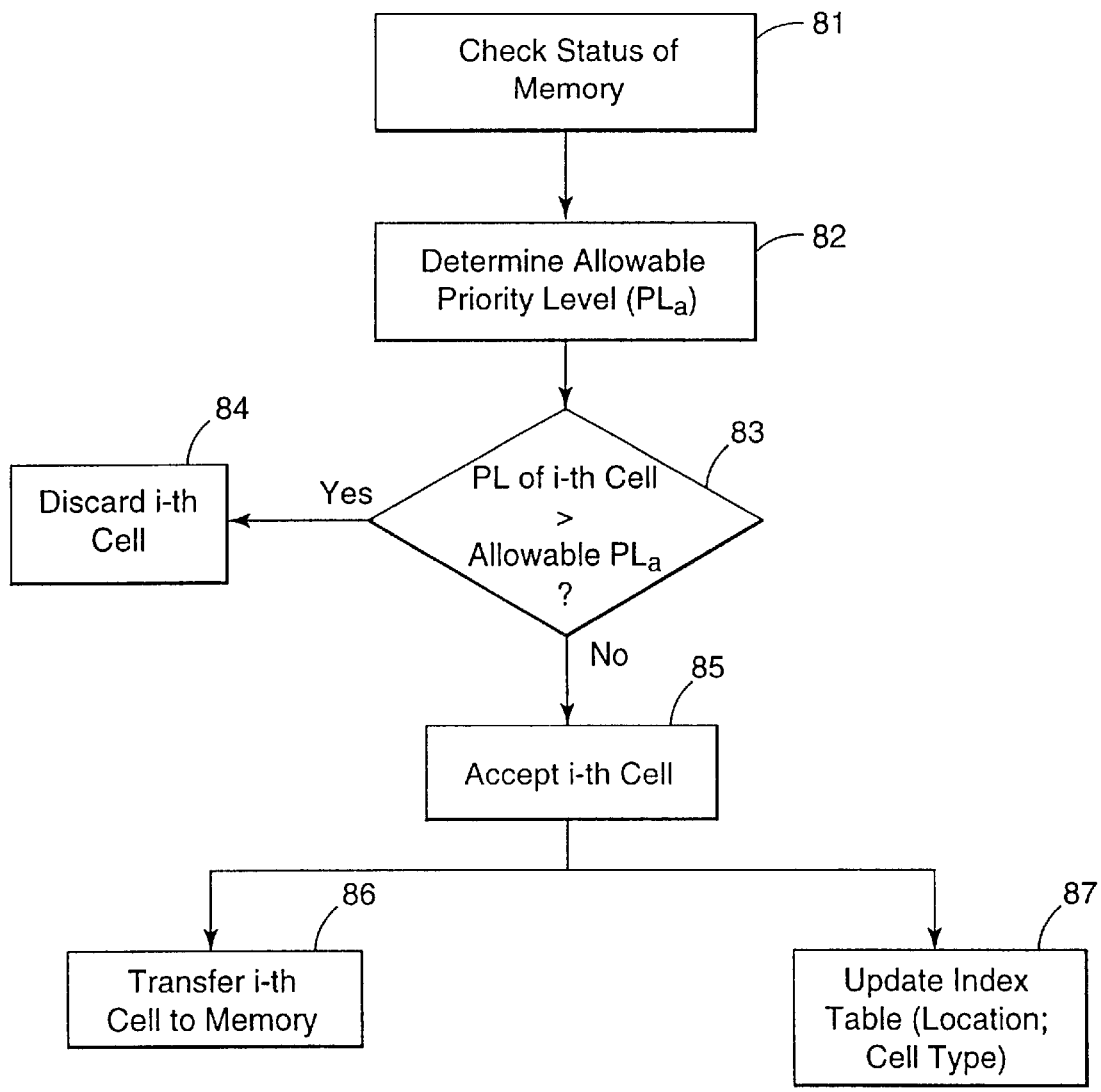
FIG. 4 illustrates in flow diagram form a general procedure for filtering cells at a network node in a nominal bit rate service.
Figure 5:
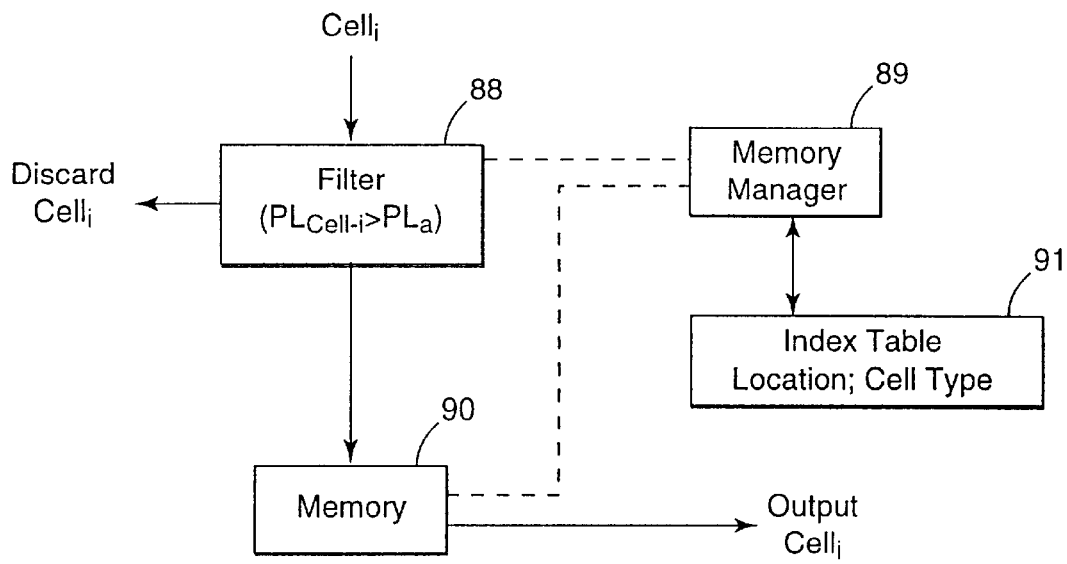
FIG. 5 is a block diagram of an embodiment of a system for filtering cells at a network node in accordance with a nominal bit rate service.

FIGS. 3–5 illustrate a procedure for scheduling and buffering cells in accordance with one embodiment of an NBR service methodology. Referring now to FIG. 3, a user establishes 60 an NBR with a network operator. It may be desirable, although not required, to initially set the service class 62 to a non-real-time (nrt) service class as a default setting. Depending on a particular application, the user may require a real-time (rt) service class 64, which may be set by the user directly or, typically, by the user's application or communications software. If the user requires a real-time connection, each cell transmitted from the user's UNI will have the service class bit in the cell header set to indicate that the payload of the cell contains real-time information 70. It is noted that within the context of a network implemented in accordance with the NBR concept of the present invention, real-time service class connections are expected to support virtually any real-time application without the need to specify particular cell transfer delay (CTD) and cell delay variation (CDV) parameters. As such, the conventional procedure of setting CTD and CDV bits of the cell header to appropriate values to accommodate the real-time service requirements of the connection is altogether obviated.

If the user does not require a real-time service connection, the default non-real-time service class condition remains operative. As such, the rt/nrt service class bit of each cell header is set to indicate that the payload of the cell includes non-real-time information 66. It is noted that the NBR service disclosed herein does not utilize the cell loss priority (CLP) scheme used by conventional ATM traffic management approaches. As such, the CLP bit in the cell header may instead be used to discern between real-time and non-real-time payloads.

In the above described embodiment, each cell transmitted over a connection is designated as either a real-time cell or a non-real-time cell, such as by appropriately setting the rt/nrt service class bit of the cell header. In an alternative embodiment, depending on a user's requirements, a connection may be designated as being either a real-time or non-real-time connection, and the cells communicated over such a connection need not be individually assigned a real-time or non-real-time status. Each node for a given connection, for example, may perform a table look up procedure upon arrival of a cell at the node to determine whether the cell is associated with a real-time or a non-real-time connection. Thus, in accordance with this embodiment, a cell header bit need not be reserved for distinguishing between real-time and non-real-time cells.

After the rt/nrt service class header bit has been set in the above-described manner, the actual bit rate of a particular cell to be transmitted between the UNI and the network is measured 74. Since, in practice, the actual bit rate may be subject to significant variability over time, a measuring unit of the UNI employs an averaging measuring principle to determine the actual or instantaneous bit rate, $MBR_i$.

In general, the UNI measures 74 the actual bit rate of a cell, such as $cell_i$, by approximating the actual or instantaneous bit rate of the connection within a measuring period having a duration that is appropriate for the particular connection (e.g., a real-time or non-real-time connection). The present invention provides for the measurement of the instantaneous bit rate, $MBR_i$.

Having determined 74 the measured bit rate, $MBR_i$, of the i:th cell, the priority level of the i:th cell is computed using the measured bit rate, $MBR_i$, and the nominal bit rate, NBR. In accordance with one embodiment, it is assumed that a cell may be distinguished from other cells using a cell prioritization scheme that employs eight priority levels. In order to indicate which of the eight priority levels is attributed to a particular cell, each cell allocates three bits for this purpose.

In accordance with current ATM specifications, an ATM cell is specified as a unit of transmission having a fixed-size frame consisting of a 5-octet header and a 48-octet payload. It is appreciated that the necessity to allocate three bits in the cell header for the purpose of designating cell priority level may require utilization of currently defined ATM header bits. By way of example, it may be possible to utilize the current Generic Flow Control (GFC) field which constitutes a total of four bits. In this case, three bits may be allocated for designating cell priority level and one bit may be designated as the rt/nrt service class bit. It may be possible, in accordance with another embodiment, to allocate other header bits for the purpose of indicating one of eight priority levels and rt/nrt service class by deviating from the five-octet header ATM specification.

As such, other header bits may be redefined to represent cell priority level and service class designations. Alternatively, one or more bits required to specify cell priority level and/or service class may be situated outside of the currently defined ATM cell header. The need to make a minor modification to the existing ATM cell header definition is significantly offset by the substantial advantages offered by employing the NBR service scheme of the present invention, such as a significant reduction in network and traffic management overhead and complexity.

It is understood that the number of priority levels may be less than eight or greater than eight. By way of example, if it is assumed that four cell header bits are allocated for purposes of indicating a cell's priority level, as many as $2^4$ (i.e., $2^{n\text{-}bits}$) or 16 priority levels may be defined. Increasing the number of priority levels within the context of an NBR service permits the network operator to make finer adjustments to the bandwidth of a particular connection when managing network traffic. The price for this finer level of traffic control is the additional cell header bit or bits needed to resolve a greater number of priority levels.

A priority level computing unit determines 76 the priority level of each cell, such as cell$_i$. In accordance with one embodiment of the present invention, and assuming that the measured bit rate is MBR$_i$ when the i:th cell is transmitted to the network, the priority level (PL$_i$) of cell$_i$ may be calculated using the following equation:

$$x = 4.5 + \frac{\ln(MBR_i / NBR)}{\ln(2)} \quad [1]$$

$$PL_i = \begin{cases} 7 & \text{if } x \geq 7 \\ \lfloor x \rfloor & \text{if } 0 < x < 7, \\ 0 & \text{if } x \leq 0 \end{cases}$$

where, $\lfloor x \rfloor$ represents the integer part of x. The present invention provides for the determination of cell priority levels (PL$_i$) using a buffer-based cell measurement and priority level assignment technique.

As will be discussed hereinbelow in accordance with an embodiment in which both NBR and traditional ATM service connections are accommodated, the zero priority level, PL=0, is reserved for those connections that use an ordinary ATM service with guaranteed bandwidth and quality of service. Accordingly, Equation [1] above may be modified so as to produce cell priority levels ranging between PL=1 and PL=7, such that $\lfloor x \rfloor$ represents the integer part of x, if 1<x<7.

It can be seen by application of Equation [1] above that if a connection is exploiting network-capacity in excess to the connection's negotiated NBR value, the priority level of cell$_i$ is at least 4. It can further be seen that if the momentary bit rate at the UNI is less than the negotiated value of NBR, PL is at most 4. The priority level scheme in accordance with this embodiment of the present invention thus permits adjustment of the relative capacity used by a connection in steps of 2. From Equation [1] above, it can be seen that for an NBR of 100 kbit/s, an MBR higher than 566 kbit/sec results in a PL of 7, and an MBR lower than 8.8 kbit/s results in a PL of 0.

The three priority level bits allocated in the cell header are set 78 for each ATM cell transferred from the UNI. The ATM cells are then transmitted 80 to targeted network nodes$_j$ identified by node addressing information provided in the cell header.

It is noted that if a user is not satisfied with the quality of service of the connection, the user may elect between at least three alternatives. First, the user may elect to keep the average bit rate unchanging, but reduce the variation of traffic process. Second, the user may elect to decrease the average bit rate, or to increase the nominal bit rate. Increasing the NBR will, however, generally result in a concomitant increase in cost for a higher speed connection. Finally, the user may change the network operator.

In FIG. 4, there is illustrated in flow diagram form a general methodology by which a network node processes cells containing priority level information received from a UNI in accordance with one embodiment of the present invention. FIG. 5 illustrates an embodiment of various components of a network node employed to effectuate the methodology illustrated in FIG. 4. It is assumed that a cell, such as cell$_i$, has been processed at a UNI and includes priority level information derived in a manner described hereinabove.

Cell$_i$ is transmitted from the UNI to a network node and is received at a filter 88 of the node. A memory manager 89 checks the status 81 of the memory 90 in order to determine the occupancy in the memory 90. The memory manager 89 determines 82 the allowable priority level (PL$_a$) based on the occupancy state of the memory 90. In general, the memory manager 89 establishes a high allowable priority which translates to a low allowable priority "level," for example PL$_a$=0 or 2, when the occupancy level of the memory 90 is high (i.e., few available memory locations). When the memory manager 89 determines that the memory 90 has ample capacity for receiving new cells, the memory manager 89 establishes a low allowable priority which translates to a high allowable priority "level," for example PL$_a$=6 or 7. As will be appreciated by those skilled in the art, the calculation of PL$_a$ could alternatively be based on unoccupied buffer capacity rather than on buffer occupancy without departing from the spirit of the invention.

If the priority level of cell$_i$ is greater than the allowable priority level, PL$_a$, as determined 83 by the memory manager 89, the filter 88 discards 84 cell$_i$. If, on the other hand, the priority level of cell$_i$ is equal to or less than the allowable priority level PL$_a$, the filter 88 accepts 85 cell$_i$. The memory manager 89 coordinates the transfer 86 of cell to the memory 90 and updates an index table 91 coupled to the memory manager 89 to include a new index table entry for newly accepted cell$_1$. In one embodiment, the index table 91 stores the location of the accepted cell$_i$ in the memory 90, and also stores a cell-type indicator which specifies whether cell$_i$ is a real-time cell or a non-real-time cell. As such, the memory 90 may store both real-time and non-real-time cells.

The memory manager 89, in cooperation with the index table 91, manages cell transfer operations from the memory 90 to the output of the memory 90 by giving preference to the real-time cells over the non-real-time cells. By way of example, the memory manager 89, upon determining the presence of both rt-cells and nrt-cells stored in the memory 90, transfers all of the rt-cells to the output of the memory 90 prior to transferring out any of the nrt-cells.

Figure 6:
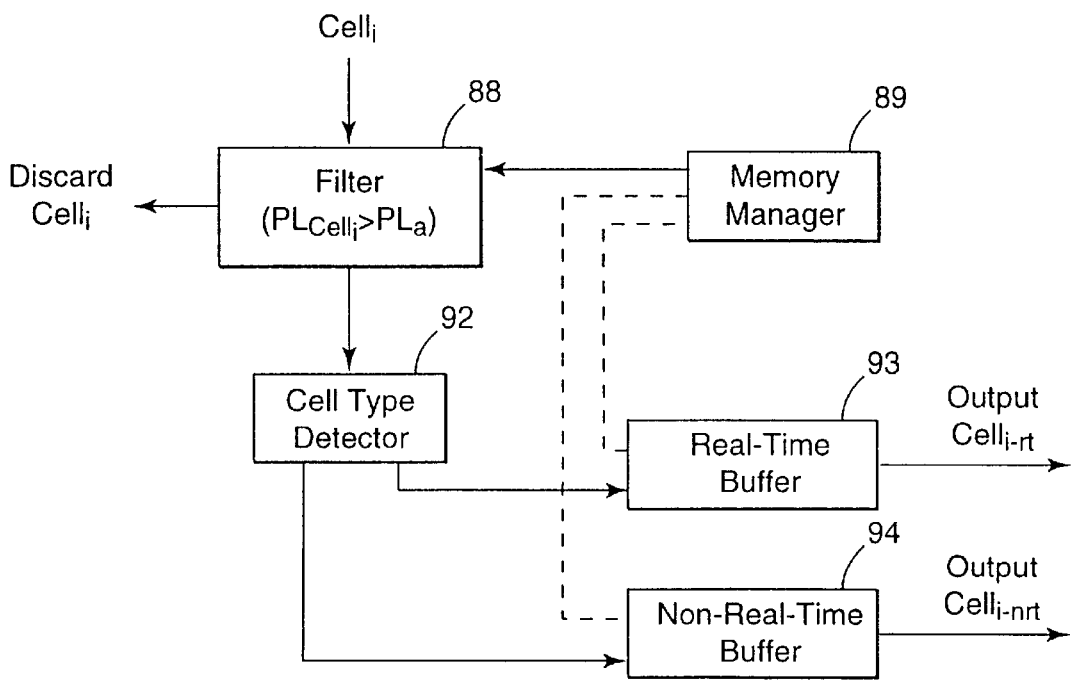
FIG. 6 is a block diagram of an alternative embodiment of a system for filtering cells at a network node in accordance with a nominal bit rate service.

As illustrated in FIG. 6, a memory manager 89 can determine the status of a real-time buffer (rt-buffer) 93 and a non-real-time buffer (nrt-buffer) 94. The memory manager 89 determines, in a manner similar to that previously described, the allowable priority level, PL$_a$, for the filter 88 based on the status of the rt-buffer 93 and the nrt-buffer 94. If the priority level of cell$_i$ is greater than the allowable priority level, PL$_a$, the filter 88 discards cell$_i$. If, on the other hand, the priority level of cell$_i$ is equal to or less than the allowable priority level, PL$_a$, cell$_i$ is accepted.

The network node may apply a buffer filtering scheme which performs the filtering function based on packets of cells, rather than on individual cells. By way of example, the filtering procedure described hereinabove may be applied to the first cell of each packet. If the first cell is discarded by the node, then all of the cells of the packet following the first cell are discarded as well. If, however, the first cell of a packet is accepted, then the priority of all other cells belonging to that packet may be increased, for example by changing the priority level from PL=5 to PL=3. A gain of even one priority level, such as from PL=4 to PL=3, is believed to be sufficient to ensure that there will only be very few partially transmitted packets.

A cell-type detector 92 receives the accepted cell, $cell_1$, from the filter 88 and determines whether $cell_i$ is an rt-cell or an nrt-cell. As discussed previously, the header of $cell_i$ includes a header bit, such as the CLP bit, which indicates whether or not $cell_i$ is an rt-cell or an nrt-cell. The cell-type detector 92, upon determining the service class type of the $cell_i$, transfers the $cell_i$ to either the rt-buffer 93 or the nrt-buffer 94. In a manner similar to that described previously with respect to FIGS. 4 and 5, the memory manager 89 coordinates the output of rt-cells and nrt-cells respectively from the rt-buffer 93 and the nrt-buffer 94, giving preference to the rt-cells.

It may be desirable, for purposes of enhancing network expansion and traffic control, to request that each user of the network purchase a maximum NBR. The maximum NBR value is intended to remain substantially constant. In addition, it may be desirable to request that each user select an appropriate instantaneous NBR, which should be no greater that the selected maximum NBR. The selection of an appropriate instantaneous NBR generally involves a compromise between price and quality of service. The service quality detected by a user depends largely on three parameters, namely the NBR, the average bit rate, and the amount of traffic variations. Although a user may change any of these parameters, the only information that the network needs to know at the initiation of cell transmission is the NBR and the service class (real-time or non-real-time) of the connection.

A SIMA service which provides for both NBR and traditional ATM services requires that the network operator dedicate a UPC device for each conventional ATM connection, or possibly for each virtual path. All of the cells transmitted using traditional ATM service connections are designated with the highest priority of PL=0 and with a real-time (rt) service class designation. In accordance with this approach, the zero priority level is reserved for those connections that use an ordinary ATM service with guaranteed bandwidth and quality of service. Accordingly, the priority determination Equation [1] above is modified so as to produce cell priority levels ranging between PL=1 and PL=7, such that $\lfloor x \rfloor$ represents the integer part of x, if 1<x<7. It is noted that if the network operator wants to mark excessive cells as CLP=1 cells, those cells may be marked with a lower priority, such as PL=6, for example.

A point of possible incompatibility with traditional ATM technology involves the necessity of three bits for each ATM cell for the determination of cell priority, or two bits if the current cell loss priority, CLP, bit in the cell header is used. In addition, one bit is needed to distinguish between real-time and non-real-time connections. The rt/nrt service bit may be, but is not required to be, included in every cell. It may be possible to utilize the current Generic Flow Control (GFC) field which constitutes a total of four bits. In this case, three bits may be allocated for designating cell priority level and one bit may be designated as the rt/nrt service class bit.

The evolution of SIMA networks as described above necessitates coexistence and cooperation with other network types that do not support SIMA features. More particularly, a manner for transporting SIMA traffic across networks that do not operate on SIMA principles would be advantageous considering existing infrastructures. The present invention addresses these issues, and is described below in connection with ATM technology. ATM is an appropriate candidate to be used with SIMA networks, as ATM is currently positioned as a popular choice for backbone network technology.

A SIMA packet can be transmitted in an ATM network using one or more ATM cells. Therefore, an IP or ATM network that supports SIMA may have to transport its SIMA packets (or cells) across a conventional ATM network that does not support SIMA. An ATM network may be viewed by a SIMA network strictly as a link or channel between SIMA networks, so that the ATM network is viewed by the SIMA networks as merely a group of links between SIMA elements. However, such an arrangement results in the loss of the SIMA multiplexing function. These ATM connections would need to have enough reserved capacity to transport all SIMA traffic, which could result in unused ATM transport capacity (reserved for SIMA connections) that could not be released for other purposes. Alternatively, where too little capacity were to be reserved and the ATM switch buffers became fully occupied, the ATM switch would drop the SIMA packets (carried in ATM cells) regardless of their designated SIMA priorities. Using this arrangement, SIMA service levels may not be distinguishable, and the purpose of providing various service levels and corresponding priority levels would be thwarted.

Another solution would be to modify the ATM network to fully support SIMA. ATM switches based on the SIMA technology would therefore necessarily feature all the functions of SIMA core network nodes. This too, however, may have disadvantages. One major obstacle is the necessity to replace existing ATM switches with new ATM switches that support SIMA. The time and expense involved in such a conversion may make this option undesirable.

Figure 7:
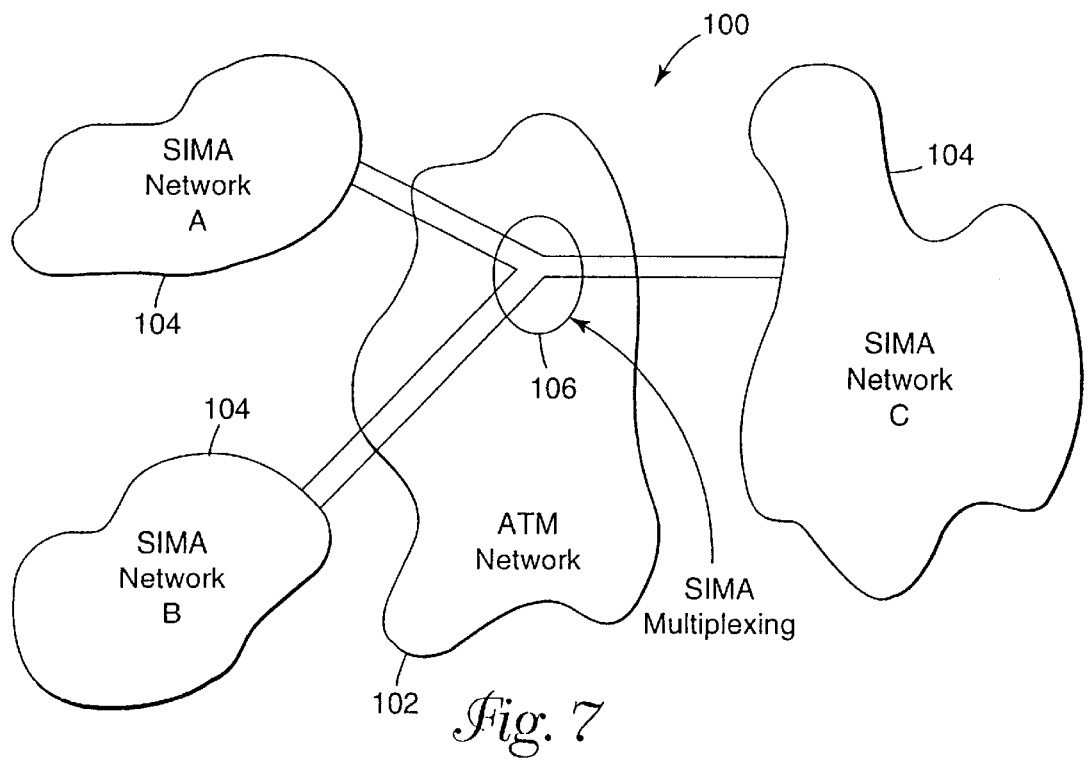
FIG. 7 illustrates a network configuration wherein an ATM network supports SIMA multiplexing in accordance with the present invention.

FIG. 7 illustrates a network configuration 100 in accordance with the present invention, where the ATM network supports SIMA multiplexing. This solution utilizes elements of an existing, conventional ATM network 102, and provides additional functional support for multiplexing SIMA cells from one or more SIMA networks 104. In one embodiment of the invention, this additional support is provided for an ATM network by an ATM SIMA Extender (ASE) 106, which allows existing ATM switch connections carrying SIMA traffic to be multiplexed. This reduces potential wasted bandwidth, and makes SIMA priority principles feasible in the ATM network. A great benefit of the present invention is that no modifications to the original ATM switch are required.

Figure 8:
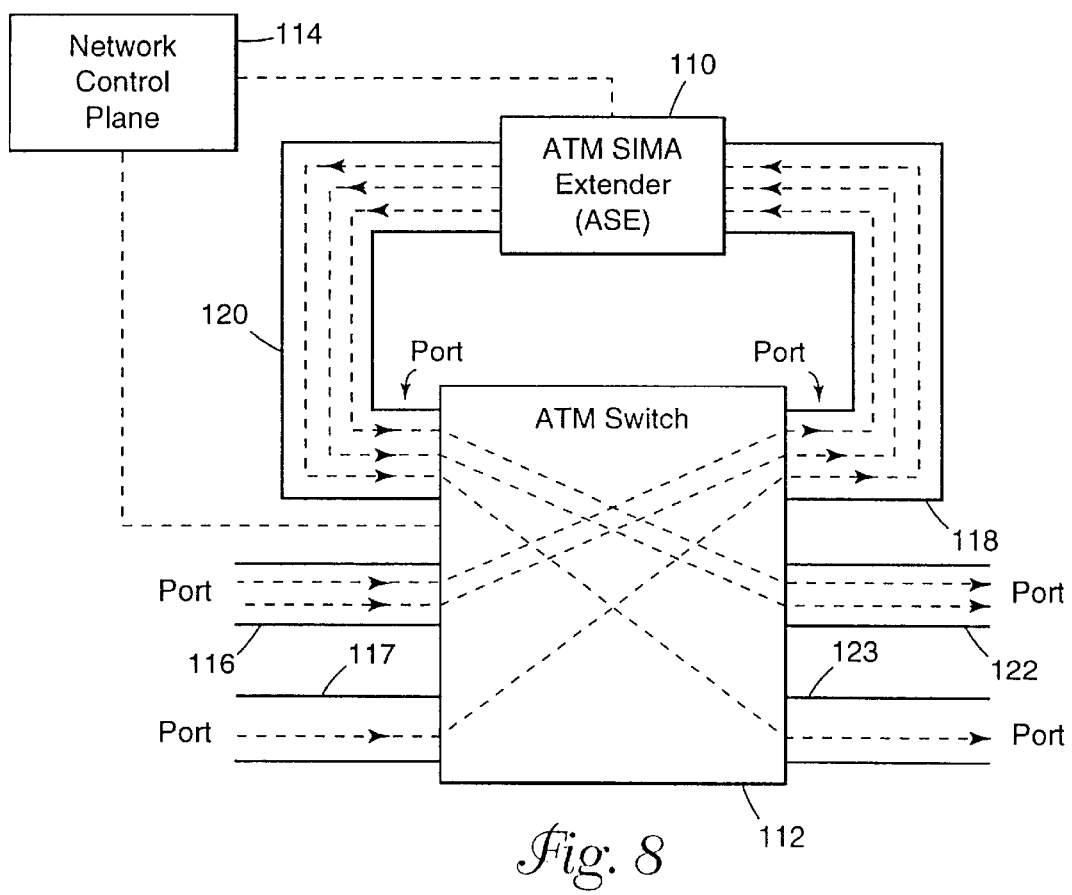
FIG. 8 is a block diagram of a SIMA extender used in connection with an ATM switch according to one embodiment of the present invention.

FIG. 8 is a block diagram of one embodiment of a SIMA extender 110 in accordance with the present invention. In the example of FIG. 8, the SIMA extender 110 is an ATM SIMA extender (ASE) used in connection with a conventional ATM switch 112. The ASE 110 includes a network device or functionality that accompanies each of the conventional ATM switches 112. Physically, the ASE 110 can be a independent device or integral to the ATM switch 112. The ATM switch 112 can be a conventional switch having no specific SIMA features.

While no modifications to the ATM switch 112 are needed, the network control plane 114 must support the use of the ASE 110. As is known to those skilled in the art, the control plane 114 handles all virtual connection-related functions, as well as addressing and routing. It provides the means to support certain types of connections on behalf of the user plane, such as switched virtual connections (SVCs) and permanent virtual connections (PVCs), which can be either point-to-point, point-to-multipoint, multipoint-to-point, or multipoint-to-multipoint virtual path or virtual circuit connections.

In a system incorporating an ASE 110 as shown in FIG. 8, an ATM cell carrying SIMA traffic can be referred to as having an ATM priority level corresponding to the priority level of the SIMA packet that is carried either partly or completely by the ATM cell.

In accordance with the present invention, there are several possible manners in which the different priority levels of such ATM cells can be separated. First, it is possible to use unused bits (such as GFC) in the header of the ATM cell to designate priority levels. Another option is to distinguish the priority level using the virtual path identifier (VPI) or the virtual channel identifier (VCI) of the ATM cell. Thus, certain virtual paths and/or virtual channels would be reserved for a particular priority level. For example, the last 3 bits in the VPI field can be used for the priority. The remaining VPI bits can be reserved for the usual routing and switching of the cells.

The ATM SIMA extender 110 of FIG. 8 allows SIMA traffic entering the ATM switch 112 to be switched to the ASE 110 to perform ATM cell multiplexing in accordance with SIMA principles. ATM cells carrying SIMA traffic and entering the input ports 116, 117 are routed to one or more dedicated output ports 118 to be routed to the ASE 110. As will be described more fully below, the ATM/SIMA cells are multiplexed at the ASE 110. The buffering within the ASE 110 is also capable of applying SIMA priority principles so that low priority cells are discarded under congestive conditions of an output port of the ATM switch 112. Then ASE 110 directs the multiplexed ATM cells back to the ATM switch 112 via dedicated input port 120 for switching to appropriate output ports 122, 123 of the ATM switch 112. From the point of view of the ATM switch 112, the connections between the switch 112 and ASE 110 do not differ from any other connection. It should be noted that the ASE 110 may be connected to the ATM switch 112 using one or more input ports, and one or more output ports, of the switch 112.

Figure 9:
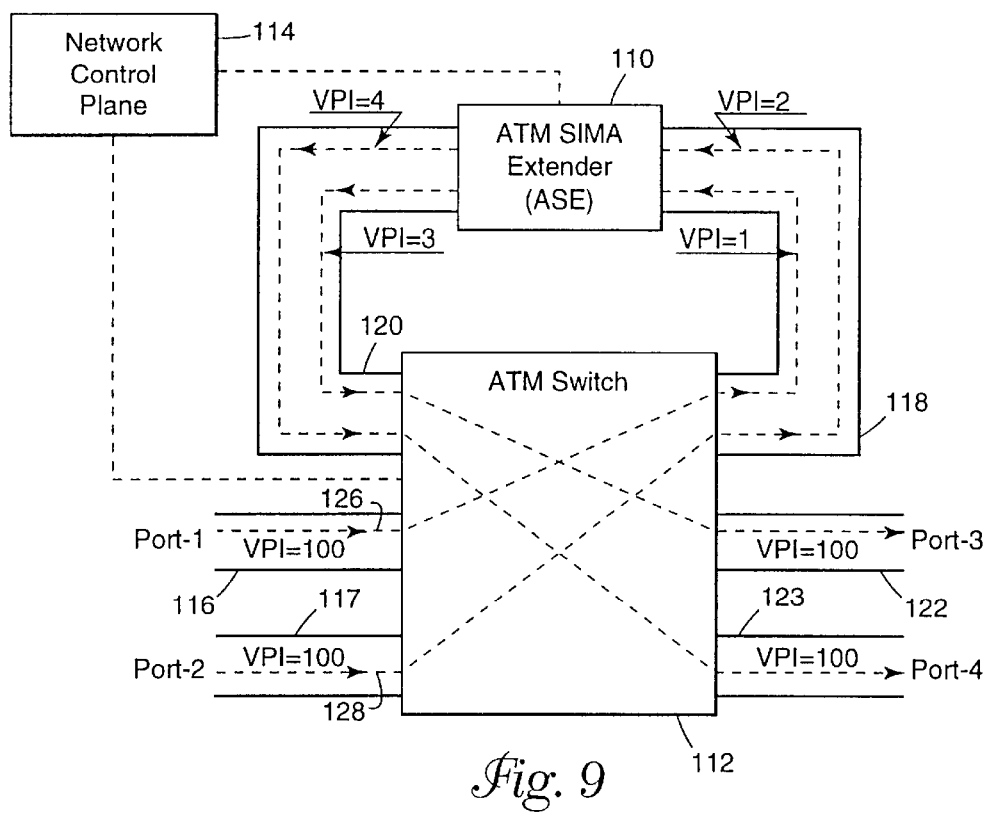
FIG. 9 illustrates an example implementation of the ATM SIMA extender in accordance with the present invention.

FIG. 9 illustrates an example implementation of the ATM SIMA extender 110 in accordance with the present invention. Like reference numbers of FIGS. 8 and 9 represent corresponding parts. For purposes of this example, it will be assumed that the CFG bits in the ATM cell header is used for indicating the SIMA priority of the SIMA packet carried by the ATM cell. In this example embodiment, each physical ATM link or "port" 116, 117, 122, 123 in the ATM switch 112 has at least one virtual path (VP) reserved for carrying SIMA traffic. Assume that a virtual path identifier (VPI) of 100 is used for SIMA traffic in all links between ATM switches. It should be understood that the VPI values given here are examples only, and generally any VPI values could be used.

Grouped within each incoming virtual path are one or more virtual channels (VC) that are used for connections between any given SIMA networks. As is known by those skilled in ATM technology, a transmission path contains one or more virtual paths, while each virtual path contains one or more virtual channels. Different transmission paths define the physical connections between various nodes, while virtual paths define the different routes that can be taken across those physical connections between nodes. Virtual channels represent the various channel connections present on any given "route" or virtual path. Virtual path connections (VPC) are switched based upon the VPI value-only, while virtual channel connections (VCC) are switched upon the combined VPI and VCI value.

Referring again to FIG. 9, the virtual path VPI=100 entering port-1 116 on line 126 may contain some virtual channels that are destined for port-3 122 and others that are destined for port-4 123. Similarly, the virtual path VPI=100 entering port-2 117 on line 128 may contain some virtual channels that are destined for port-3 122 and others that are destined for port-4 123. The ATM switch 112 switches the two incoming virtual paths at ports 116 and 117 to the output port 118 which is coupled to the ASE 110. For convenience and clarity, the VPIs between the ATM switch 112 and the ASE 100 in this example are set equal to their corresponding source and destination port numbers (VPI=1 from port-1, etc.).

The input of the ASE 110 is supplied via the dedicated SIMA output port 118 by a virtual path from each input port of the ATM switch 112. The ASE 110 then multiplexes the virtual channels carrying SIMA traffic. For example, all virtual channels received by the ATM switch 112 at port-1 116 or port-2 117 that are destined for port-3 122 will be multiplexed by the ASE 110 such that the virtual path identifier will be VPI=3 at the output of the ASE 110 to the dedicated SIMA input port 120. The output port of ASE 110 therefore contains one virtual path for each available output port of the ATM switch 112. The ATM switch 112 can then switch the virtual paths from the ASE 110 to their appropriate output ports. The ATM virtual paths from the dedicated SIMA input port 120 to the output ports 122, 123 will again have VPI of 100.

Figure 10:
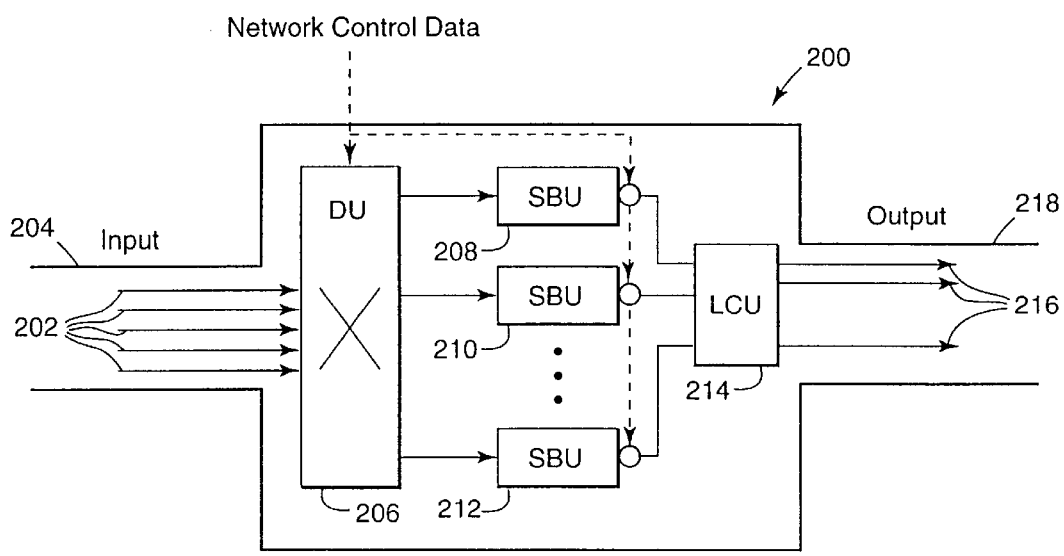
FIG. 10 illustrates one embodiment of a SIMA extender in accordance with the present invention.

FIG. 10 illustrates one embodiment of a SIMA extender 200 in accordance with the present invention. The SIMA extender 200 may be an ATM SIMA extender (ASE), or may be associated with other path/channel-oriented networking technologies. For purposes of illustration, the SIMA extender 200 will be described in terms of an ATM SIMA extender.

Virtual paths (VPs) 202 originating at the input ports of an ATM switch are switched to a dedicated ATM switch output, and are routed to the input 204 of ASE 200. These VPs 202 are input into the distributor unit (DU) 206. The main purpose of the DU 206 is to distribute the virtual channels according to the information provided by network control data. The virtual channels are configured based on the routing information that comes from the network control plane, which provides the network control data. A scheduling and buffering unit (SBU) exists for each output port of the ATM switch. These SBUs are illustrated in FIG. 10 as SBU 208, 210 through 212. The distributor unit 206 forwards ATM cells destined for a particular output port to their respective SBU.

Figure 11:
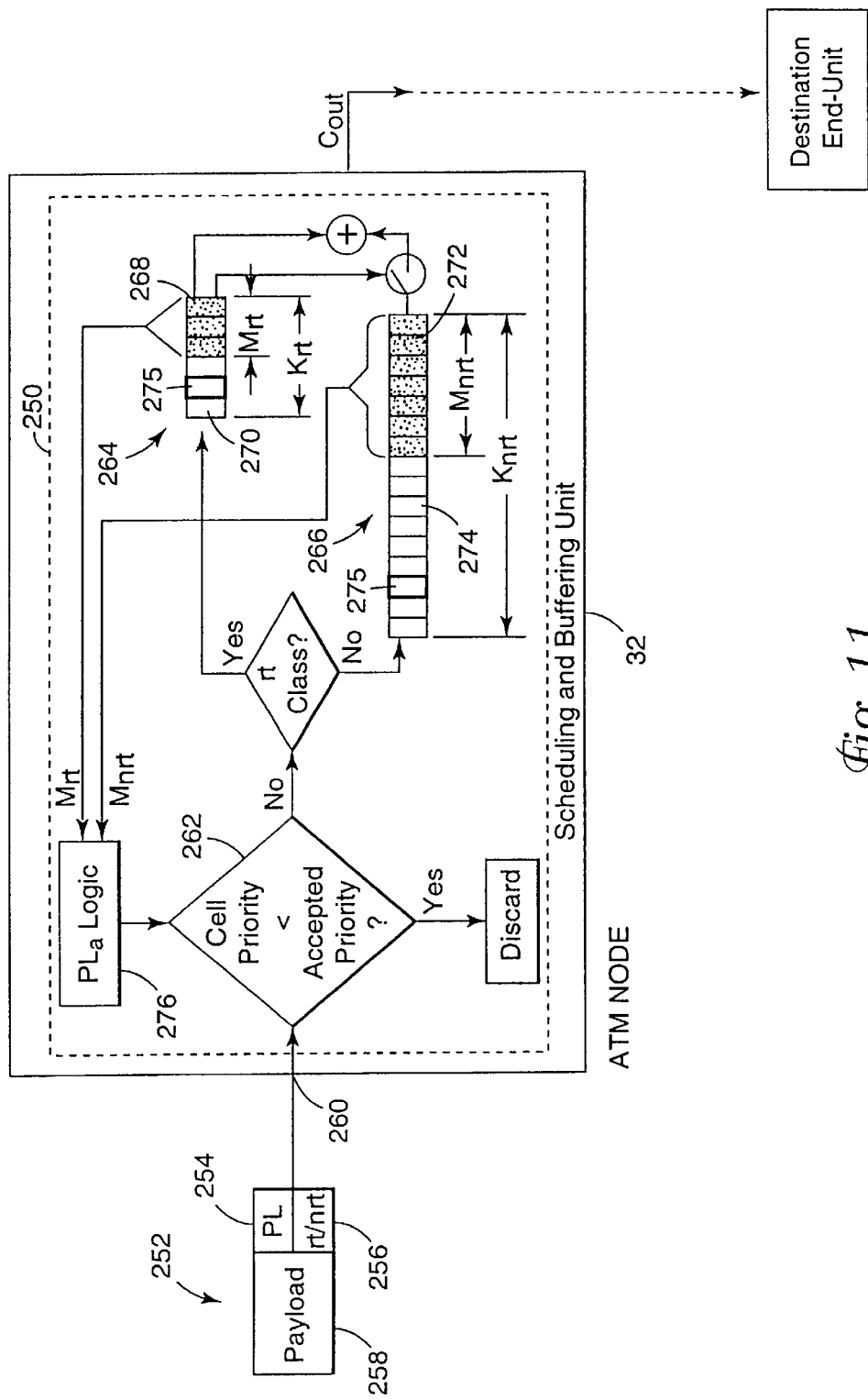
FIG. 11 is a diagram of a cell scheduling and buffering unit (SBU) in accordance with one embodiment of the present invention.

The use of the SBUs within the ASE allows the SIMA priority principles to be maintained in the ATM networking environment. The cell scheduling and buffering units 208, 210 through 212 determine whether the incoming cell has an acceptable priority level to avoid being discarded. The SBUs also provide a buffering function for both real-time and non-real-time payload information. The incoming cell or packet is discarded based on both the priority (PL) of the cell, and the accepted priority level $PL_a$ at that location or node. If the priority of the incoming packet is not greater than or equal to the accepted priority level at the node, the packet is discarded. Otherwise, the packet is accepted, and passed to the appropriate internal buffer. The calculation of $PL_a$ is based on the occupancy level of the buffers. After a packet has been accepted, it is sent to a real-time or non-real-time buffer based on the real-time bit indicator of the packet. The buffers of SBU are emptied with a rate $C_{out}$, and the real-time buffer is emptied before the non-real-time buffer. FIG. 11 and the corresponding description below provide a more detailed description of SBU operation.

Referring now to FIG. 11, there is illustrated a diagram of a cell scheduling and buffering unit (SBU) 250 in accordance with one embodiment of the present invention. As described hereinabove, each cell received at an ATM node 32 has associated with it a priority level previously established based on traffic conditions at a source UNI 24. In addition, each cell has associated with it a service class indicator which identifies the cell as containing real-time or non-real-time payload. The cell scheduling and buffering unit 250 provides for efficient processing of both real-time and non-real-time cells based solely on two external considerations: the priority level and the service class status of each cell.

As is illustrated in FIG. 11, a cell, such as cell$_i$ 252 includes a priority level (PL) 254, a real-time/non-real-time (rt/nrt) indicator 256, and a payload 258. The cell$_i$ 252 is received at an input 260 of the cell scheduling and buffering unit 250. A cell filter 262 determines the priority level of cell$_i$ 252 by reading the priority level bits PL 254 of the cell header. As part of the cell filtering procedure, the allowable priority level, $PL_a$, is computed based on the current status of typically two buffers provided in the cell scheduling and buffering unit 250.

In accordance with one embodiment of the SBU 250, two buffers, a real-time buffer 264 and a non-real-time buffer 266 are included. The occupancy level of the two buffers 264, 266 is computed by determining the number of cells currently residing in the rt-buffer 264, denoted $M_{rt}$, and the number of cells currently residing in the nrt-buffer 266, denoted $M_{nrt}$. This can be accomplished in a variety of manners, including using an arithmetic logic unit or similar processing device to determine the difference between an address of the most recent cell entered into the buffer and an address corresponding to an empty buffer, or the current buffer occupancy address can be compared to one of a plurality of predefined occupancy ranges or levels.

It is noted that the shaded portion of the rt-buffer 264 represents an occupied rt-buffer portion 268, while the unshaded section represents an unoccupied rt-buffer portion 270. Similarly, an occupied nrt-buffer portion 272 of the nrt-buffer 266 is indicated by the shaded region, whereas the unshaded region represents an unoccupied nrt-buffer portion 274. It is further noted that each of the buffers 264, 266 include a number of buffer locations 275, and that the number of non-real-time buffer locations defining the nrt-buffer 266 typically exceeds the number of buffer locations defining the rt-buffer 264.

For purposes of illustration, and not of limitation, the following buffer parameters are defined:

$M_{rt}$=the number of cells in the rt-buffer 264
$K_{rt}$=the number of buffer places in the rt-buffer 264
$M_{nrt}$=the number of cells in the nrt-buffer 266
$K_{nrt}$=the number of buffer places in nrt-buffer 266

A processor, represented as $PL_a$ logic 276, determines the number of cells currently occupying the rt-buffer 264 ($M_{rt}$) and the number of cells currently occupying the nrt-buffer 266 ($M_{nrt}$). The processor 276 also determines the number of buffer locations 275 defining the rt-buffer 264 ($K_{rt}$) and the number of buffer locations 275 defining the nrt-buffer 266 ($K_{nrt}$). The occupancy levels of the rt-buffer 264 ($x_{rt}$) and the nrt-buffer 266 ($x_{nrt}$) are respectively determined using Equations [2] and [3] below:

$$x_{rt}=M_{rt}/K_{rt}$$
$$x_{nrt}=M_{nrt}/K_{nrt} \quad [2/3]$$

The average occupancy level of the total buffering system (x) is then determined by one of several ways, including, for example, by use of any of the following equations:

$$x = (x_{rt} + x_{nrt}) \quad (a)$$
$$x = \sqrt{x_{rt}^2 + x_{nrt}^2} \quad (b)$$
$$x = \max(x_{rt}, x_{nrt}) \quad (c)$$

[4(a)/(b)/(c)]

The priority level PL 254 of cell$_i$ 252 ($PL_{cell-i}$) is compared to the result produced from use of the following equation:

$$PL < a - bx \quad [5]$$

where, a and b are constants, and it is assumed for purposes of this example that a=b=9. Cell$_i$252 is accepted or discarded depending on the result of the comparison performed using Equation [5] above.

It may be advantageous to determine the allowable priority level, $PL_a$, using an alternative aproach. Initially, it is assumed that the occupancy level of the rt-buffer 264, $x_{rt}$, and that of the nrt-buffer 266, $x_{rt}$, are divided into N levels, where N may be, for example, 16 or 12. For purposes of illustration, Table 1 provided below assumes that the occupancy level of the two buffers 264, 266 are divided into N=12 levels. When a cell arrives at the cell scheduling and buffering unit 250, the scheduling processor 276 determines the current values of $M_{rt}$ and $M_{nrt}$. By use of a simple calculation, especially if $K_{rt}$, $K_{nrt}$, and N are of the form $2^n$, an estimate of the current occupancy level of both buffers 264, 266 may be obtained. These two values, $x_{rt}$ and $x_{nrt}$, determine the rows and columns of Table 1. The contents of each cell of Table 1 represents the highest allowed priority level, $PL_a$, in view of the current status of the two buffers 264, 266 upon arrival of cell$_i$252.

TABLE 1

| $\lfloor 12x_{nrt} \rfloor$ | $\lfloor 12x_{rt} \rfloor$ | | | | | | | | | | | |
| --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 |
| 0 | 7 | 7 | 7 | 7 | 6 | 6 | 5 | 4 | 3 | 2 | 1 | 0 | — |
| 1 | 7 | 7 | 7 | 7 | 6 | 6 | 5 | 4 | 3 | 2 | 1 | 0 | — |
| 2 | 7 | 7 | 7 | 6 | 6 | 6 | 5 | 4 | 3 | 2 | 1 | 0 | — |
| 3 | 7 | 7 | 6 | 6 | 6 | 5 | 5 | 4 | 3 | 2 | 1 | 0 | — |
| 4 | 6 | 6 | 6 | 6 | 5 | 5 | 4 | 4 | 3 | 2 | 1 | 0 | — |
| 5 | 6 | 6 | 6 | 5 | 5 | 4 | 4 | 3 | 3 | 2 | 1 | 0 | — |
| 6 | 5 | 5 | 5 | 5 | 4 | 4 | 3 | 3 | 2 | 2 | 1 | 0 | — |
| 7 | 4 | 4 | 4 | 4 | 4 | 3 | 3 | 2 | 2 | 1 | 1 | 0 | — |
| 8 | 3 | 3 | 3 | 3 | 3 | 3 | 2 | 2 | 1 | 1 | 0 | 0 | — |
| 9 | 2 | 2 | 2 | 2 | 2 | 2 | 2 | 1 | 1 | 0 | 0 | 0 | — |
| 10 | 1 | 1 | 1 | 1 | 1 | 1 | 1 | 1 | 0 | 0 | 0 | 0 | — |
| 11 | 0 | 0 | 0 | 0 | 0 | 0 | 0 | 0 | 0 | 0 | 0 | 0 | — |
| 12 | — | — | — | — | — | — | — | — | — | — | — | — | — |

It can be seen that Table 1 provides a useful estimate of the highest allowed priority level, $PL_a$, which reflects both the status and the relative sizes of the rt-buffer 264 and the nrt-buffer 266. An array of the values of Table 1 may be stored and updated as needed in non-volatile memory within the node 32.

Referring again to FIG. 10, the distributor unit (DU) 206 directs the ATM cells to the appropriate SBU 208, 210, 212. The output rate $C_{out}$ of an SBU can be determined by the network control information provided from network control plane. This output rate should be equal to or less than the bandwidth reserved for the SIMA traffic virtual path at the output port of the ATM switch. It is possible to dynamically control the bandwidth through the control plane of the network. For example, when the network control plane recognizes a reduction in the quantity of non-SIMA traffic at port 3, it can notify the SBU that the output rate $C_{out}$ can be increased and thereby assign additional bandwidth to the VPI=100 virtual path at port 3. The link control unit (LCU) 214 is coupled to each of the SBUs in the ASE 200, and links the virtual paths 216 at the output 218 in a predetermined manner. The LCU 214 assigns the capacity of the link from the ASE output to the ATM switch input between different SBUs, For example, the LCU 214 can utilize a first-in-first-out (FIFO) buffer, or a known round robin method.

Figure 12:
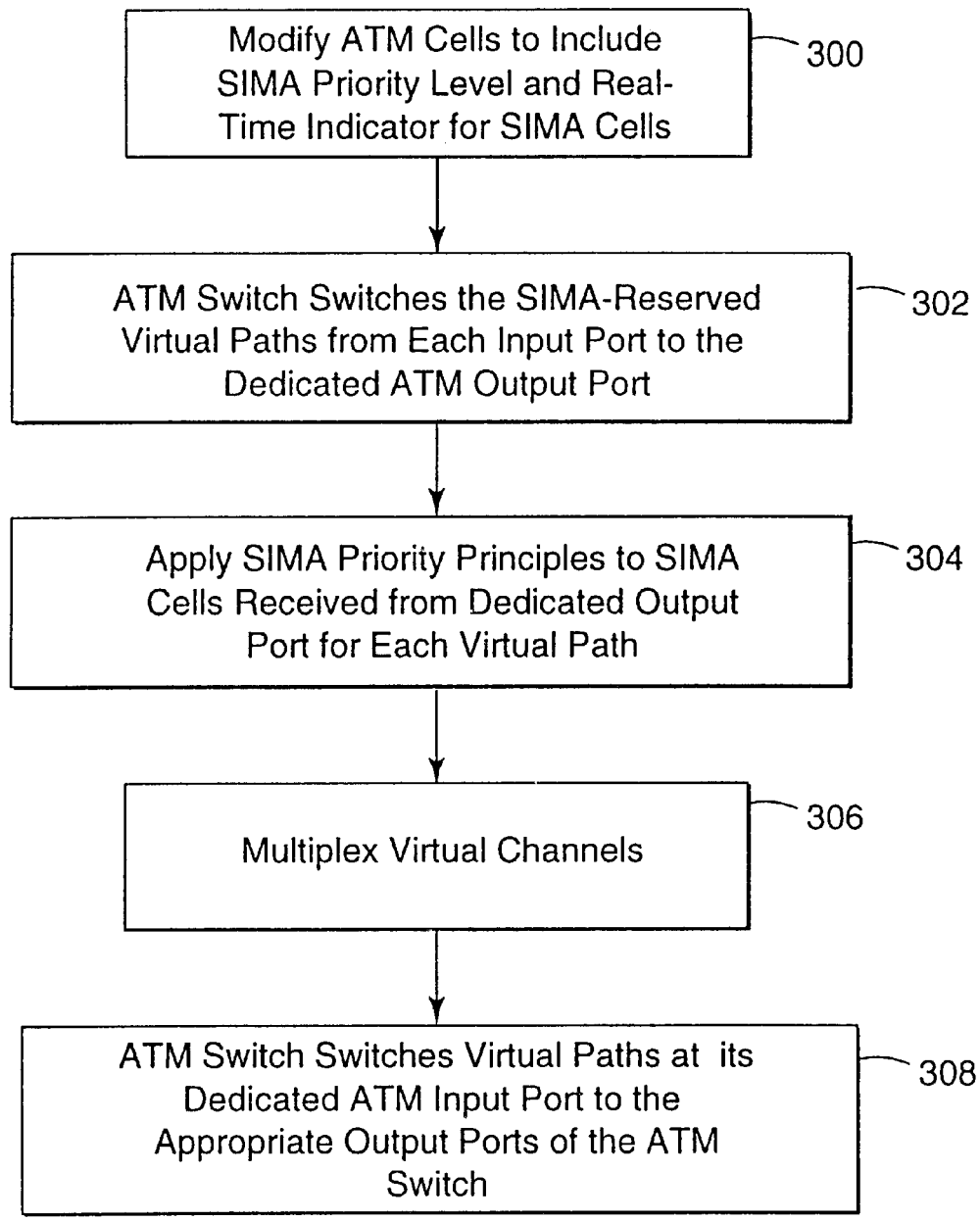
FIG. 12 is a flow diagram illustrating one embodiment of the manner in which the infusion of SIMA traffic in an ATM network is realized.

FIG. 12 is a flow diagram illustrating one embodiment of the manner in which the infusion of SIMA traffic in an ATM network is realized. First, the ATM cells are modified 300 to include SIMA priority levels and real-time indicators for SIMA cells. As previously described, this can be accomplished using unused bits (such as GFC) in the ATM cell header, through the VPI or VCI in the ATM cell header, or the like. The ATM switch then switches 302 the SIMA-reserved virtual paths from each input port to a dedicated ATM switch output port. From this dedicated output port come all SIMA-reserved virtual paths carrying SIMA-converted ATM cells. The SIMA priority principles described herein are then applied to the SIMA cells received for each of the virtual paths from the dedicated ATM switch output port, as seen at block 304. The virtual channels are multiplexed 306, such that all virtual channels from each virtual path input are multiplexed to the proper virtual path output. This will result in the existence of one virtual path output for each output port of the ATM switch, where all virtual channels destined for a particular ATM output port are provided by its respective virtual path output. The ATM switch switches 308 the virtual paths is at its dedicated ATM input port to the appropriate output ports of the ATM switch. It should be noted that the VPI of the dedicated SIMA virtual paths at the output ports of the ATM switch are the same as the VPI of the dedicated SIMA virtual paths at the input of the ATM switch. Therefore, the switching function of the ATM switch appears to function as with any other standard ATM cells, while the multiplexing of SIMA cells, as well as packet discarding due to ATM switch congestion, can be maintained.

It will, of course, be understood that various modifications and additions can be made to the various embodiments discussed hereinabove without departing from the scope or spirit of the present invention. Accordingly, the scope of the present invention should not be limited by the particular embodiments discussed above, but should be defined only by the claims set forth below and equivalents thereof.

We claim:

1. A method of communicating first data packets having a first quality of service over a network system designed for communicating second data packets having a second quality of service, wherein the network system comprises a plurality of network nodes each having a network switch, comprising:

switching the first data packets from each of a plurality of network switch input ports to a dedicated output port of the network switch;

applying network node congestion control to the first data packets at the dedicated output port to selectively accept or discard individual ones of the first data packets in accordance with first quality of service acceptance principles;

multiplexing accepted ones of the first data packets into one or more virtual paths having common output port destinations;

inputting the one or more virtual paths into a dedicated input port of the network switch; and switching the one or more virtual paths at the dedicated input port to output port destinations of the network switch identified by the common output port destinations.

2. The method as in claim 1, further comprising assigning a virtual path at each of the network switch input ports to carry the first data packets having the first quality of service.

3. The method as in claim 1, further comprising associating the first data packets with a predetermined virtual path identifier, and wherein switching the first data packets to a dedicated output port comprises ascertaining the virtual path identifiers of each of the first and second data packets input to the network switch, and directing the first data packets having the predetermined virtual path identifier to the dedicated output port.

4. The method as in claim 1, wherein applying network node congestion control in accordance with first quality of service acceptance principles comprises:

determining a data packet occupancy level of a packet buffer coupled to receive the first data packets from the dedicated output port;

establishing an allowable priority level associated with the network node based on the occupancy level of the packet buffer;

detecting a priority level identifier in each of the first data packets received at the dedicated output port, the priority level identifier indicating a relative priority of each of the first data packets with respect to the other ones of the first data packets; and accepting the first data packets into the packet buffer upon recognition of the priority level identifier of particular ones of the first data packets being within the allowable priority level.

5. The method as in claim 4, wherein multiplexing accepted ones of the first data packets comprises multiplexing the accepted data packets in the packet buffer into the one or more virtual paths having common output port destinations.

6. The method as in claim 5, wherein multiplexing the accepted data packets in the packet buffer comprises assigning a virtual path identifier to each of the accepted data packets.

7. The method as in claim 6, wherein switching the one or more virtual paths comprises directing the accepted data packets to their respective output port destinations based on the virtual path identifiers of each of the accepted data packets.

8. A method of communicating simple integrated media access (SIMA) information elements over a conventional, non-SIMA network system, wherein the non-SIMA network system comprises a plurality of network nodes each having a network switch, comprising:

reserving one or more reserved virtual paths from each input port of the network switch for transmitting the SIMA information elements into the network switch;

switching the one or more reserved virtual paths from each of the input ports to a dedicated output port of the network switch;

applying network node congestion control to the SIMA information elements in accordance with predefined SIMA priority principles;

multiplexing virtual channels from each of the one or more reserved virtual paths at the dedicated output port, such that the virtual channels having common output port destinations are collectively bundled into distinct virtual path outputs;

providing the distinct virtual path outputs to a dedicated input port of the network switch; and switching the distinct virtual path outputs at the dedicated input port to their respective output ports of the network switch based on the common output port destinations.

9. The method of claim 8, wherein reserving at least one virtual path comprises assigning a predetermined virtual path identifier to each of the SIMA information elements in each of the input ports of the network switch.

10. The method of claim 9, wherein switching the reserved virtual paths from each of the input ports to a dedicated output port comprises identifying, at the network switch, the virtual path identifiers associated with the SIMA information elements, and directing the associated SIMA information elements to the dedicated output port.

11. The method of claim 8, wherein applying network node congestion control to the SIMA information elements comprises:

determining an occupancy level of SIMA information elements in a queue coupled to receive the SIMA information elements from the dedicated output port;

establishing an allowable priority level associated with a network node based on the occupancy level of the queue;

detecting a priority level identifier in each of the SIMA information elements received at the dedicated output port, the priority level identifier indicating a relative priority of each of the SIMA information elements with respect to other ones of the SIMA information elements; and accepting the SIMA information elements into the queue upon recognition that the priority level identifier of a particular one of the SIMA information elements is less than or equal to the allowable priority level established at the network node.

12. A network system capable of communicating packet-based SIMA and non-SIMA information elements between two or more end units in the network system, the network system comprising:

a non-SIMA network switch for multiplexing and routing the packet-based information elements between switch input ports and switch output ports on the network switch based on an information element address, the network switch comprising:

a dedicated output port coupled to one or more of the inputs ports through the network switch to receive the SIMA information elements; and a dedicated input port coupled to receive filtered SIMA information elements;

a switch extension module, for seamlessly switching SIMA information elements, coupled the dedicated output port to receive the SIMA information elements, and coupled to the dedicated input port to provide the filtered SIMA information elements to the dedicated input port, the extension module comprising a packet filtering module to generate the filtered SIMA information elements by applying SIMA congestion management principles to each of the received SIMA information elements.

13. The network system of claim 12, wherein the non-SIMA network switch comprises an Asynchronous Transfer Mode (ATM) network switch.

14. The network system of claim 12, wherein the information element address is a virtual path identifier stored in a header of the SIMA and non-SIMA information elements.

15. The network system of claim 12, further comprising a network control module to provide channel routing information, and wherein the switch extension module comprises a distributor unit coupled to an input of the switch extension module to receive the SIMA information elements on each virtual channel, and to distribute the virtual channels to the packet filtering module in accordance with the channel routing information provided by the network control module.

16. The network system of claim 15, wherein the packet filtering module comprises a plurality of packet scheduling and buffering units coupled to receive the SIMA information elements from each of the virtual channels provided by the distributor unit.

17. The network system of claim 16, wherein each of the packet scheduling and buffering units comprises:

a buffer to temporarily store the SIMA information elements entering the switch extension module from the dedicated output port;

a buffer occupancy level detector coupled to the buffer to determine the occupancy level of the SIMA information elements currently residing in the buffer, and to convert the occupancy level of the buffer into an allowable priority level associated with the network node;

a comparator coupled to receive the allowable priority level and a priority level identifier associated with each of the SIMA information elements, to enable input of a SIMA information element having a priority level identifier designating a priority greater than or equal to the allowable priority level into the buffer, and to discard the SIMA information element if the priority level identifier designates a priority less than the allowable priority level.

18. The network system of claim 16, further comprising a link control unit coupled to each of the packet scheduling and buffering units to multiplex the SIMA information elements in the buffer into one or more virtual paths having common output port destinations.

* * * * *